Figure 6:
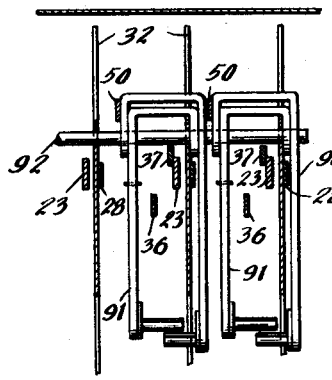

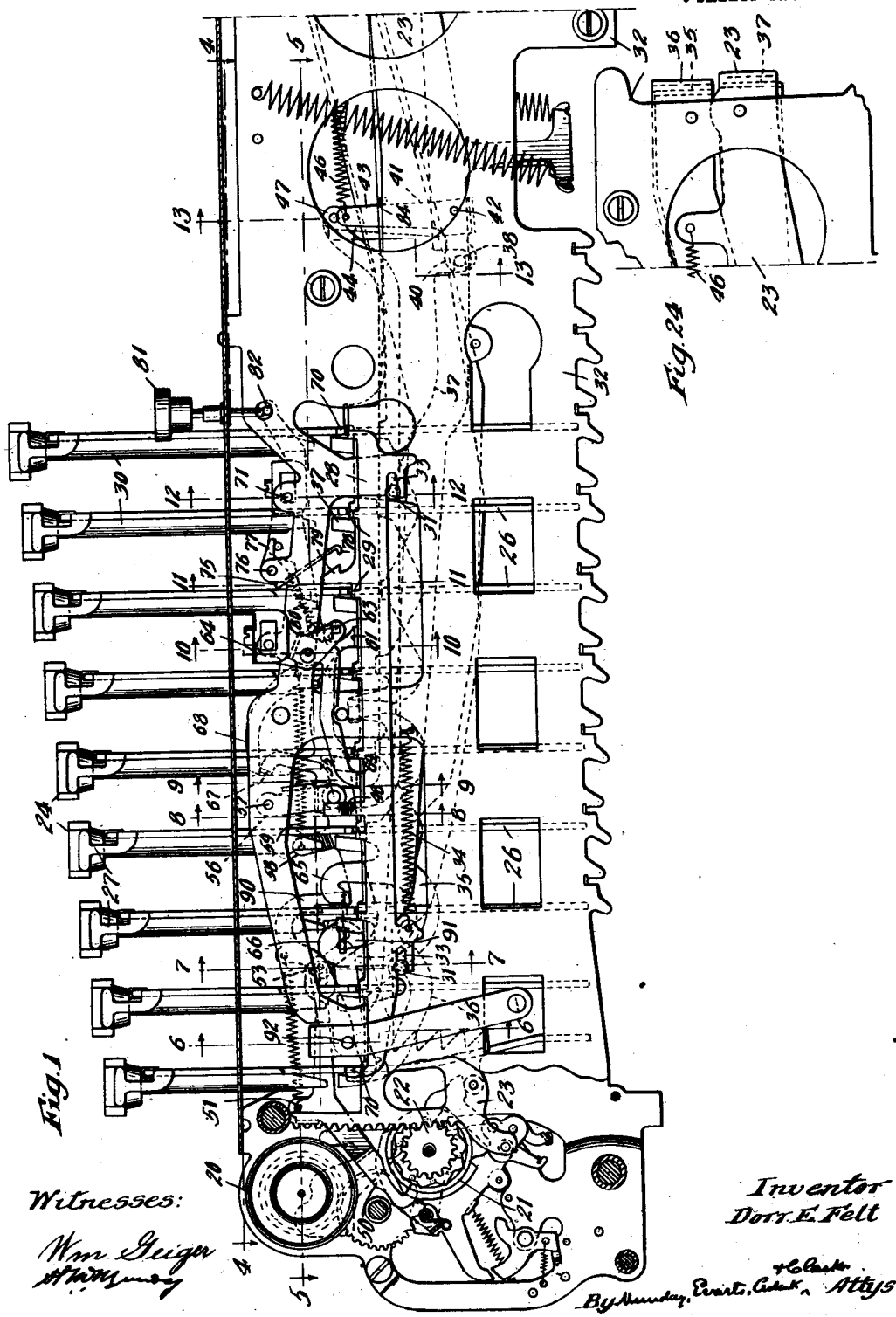
D. E. FELT.
CALCULATING MACHINE.
APPLICATION FILED JULY 12, 1912.
1,066,096. Patented July 1, 1913.
9 SHEETS—SHEET 1.
Inventor
Dorr E. Felt

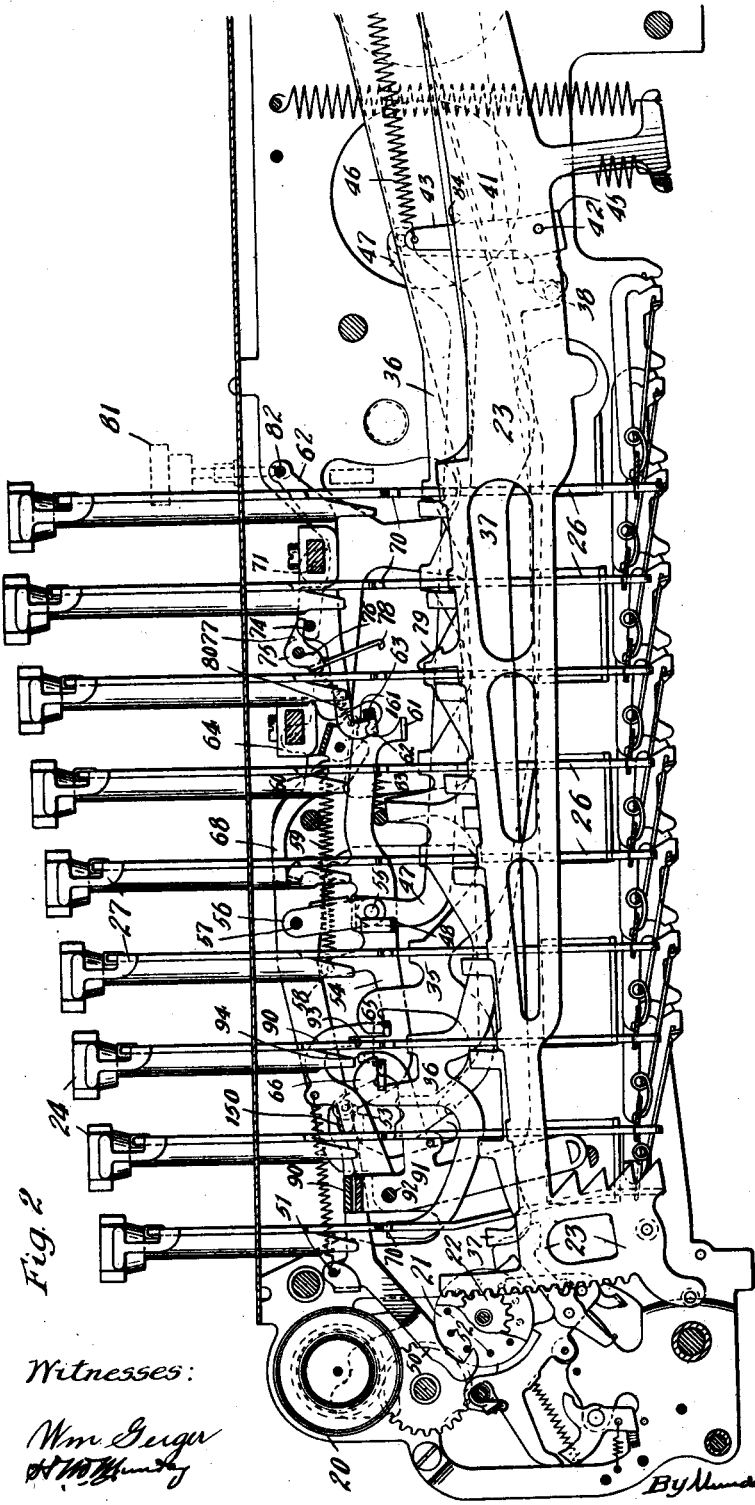

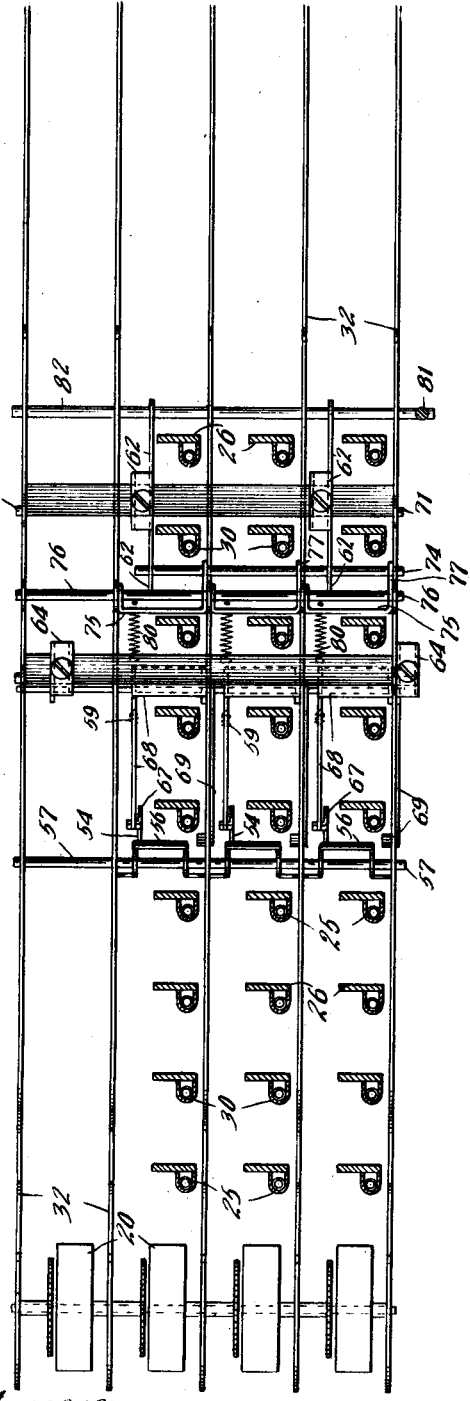

D. E. FELT.
CALCULATING MACHINE.
APPLICATION FILED JULY 12, 1912.
1,066,096.
Patented July 1, 1913.
9 SHEETS—SHEET 5.
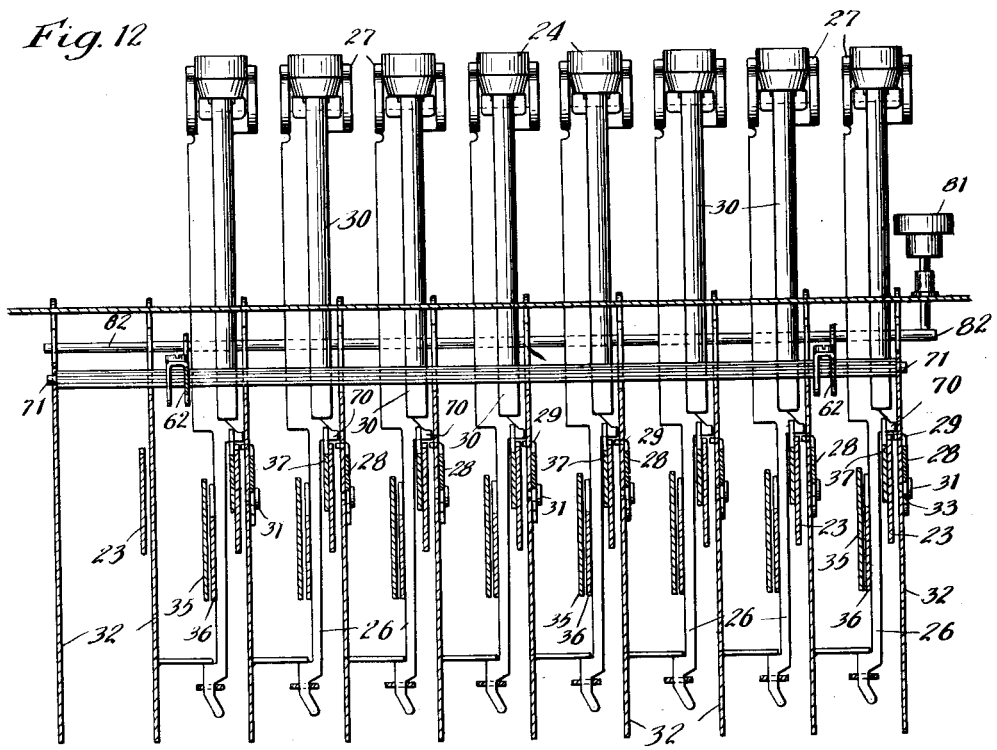
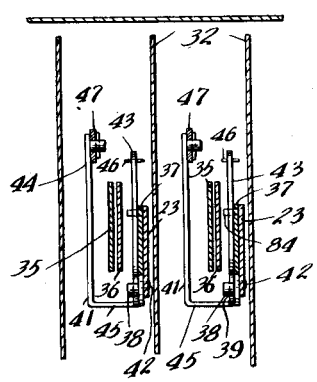
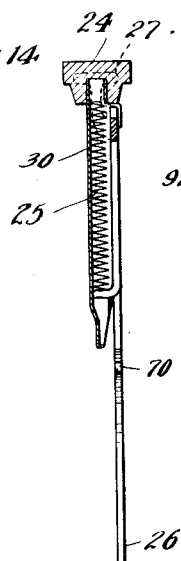
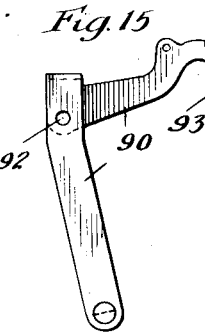
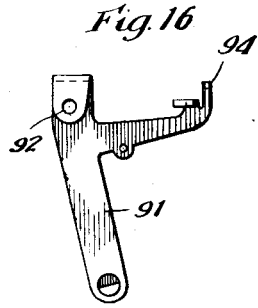
Witnesses:
Inventor:
Dorr E. Felt

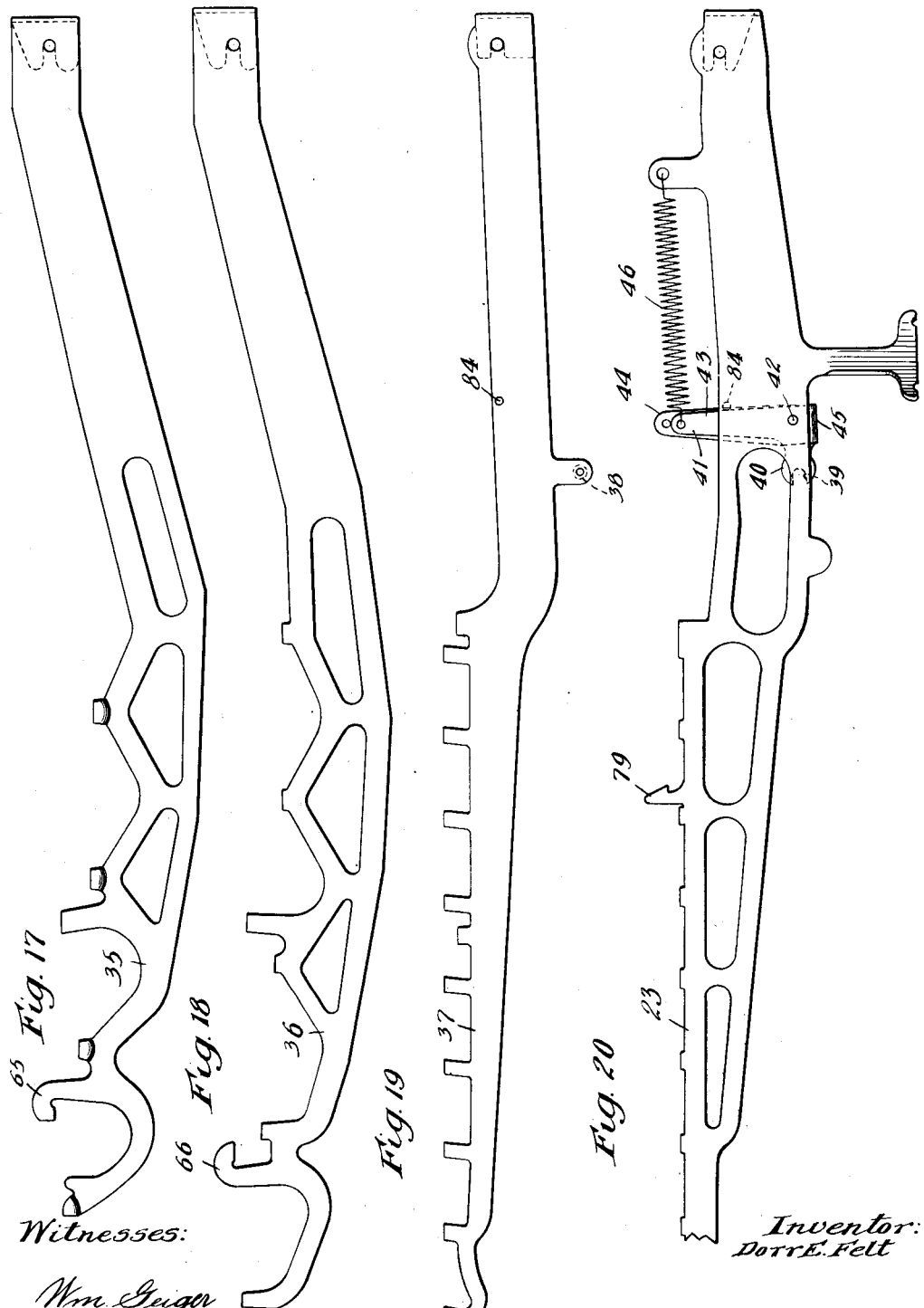

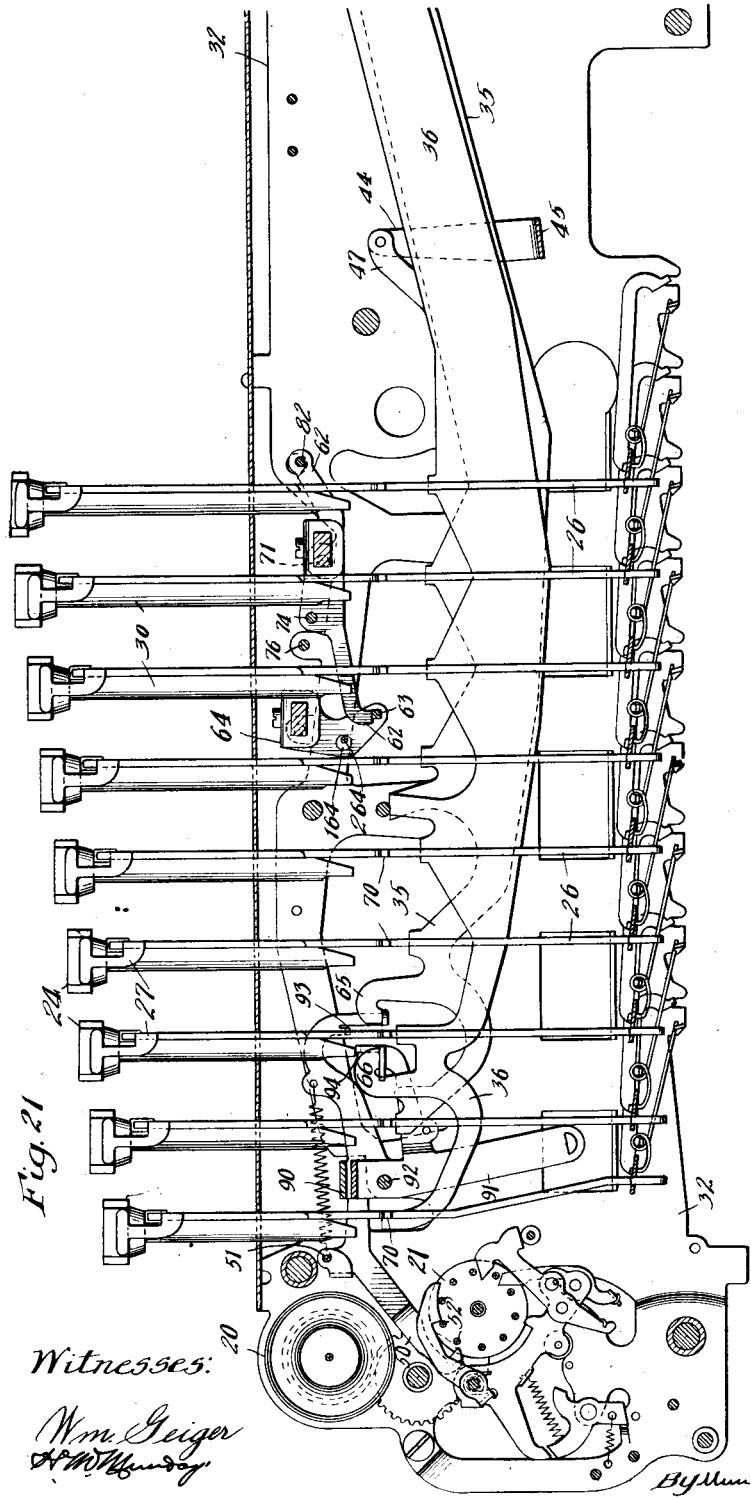

D. E. FELT.
CALCULATING MACHINE.
APPLICATION FILED JULY 12, 1912.
1,066,096.
Patented July 1, 1913.
9 SHEETS—SHEET 8.
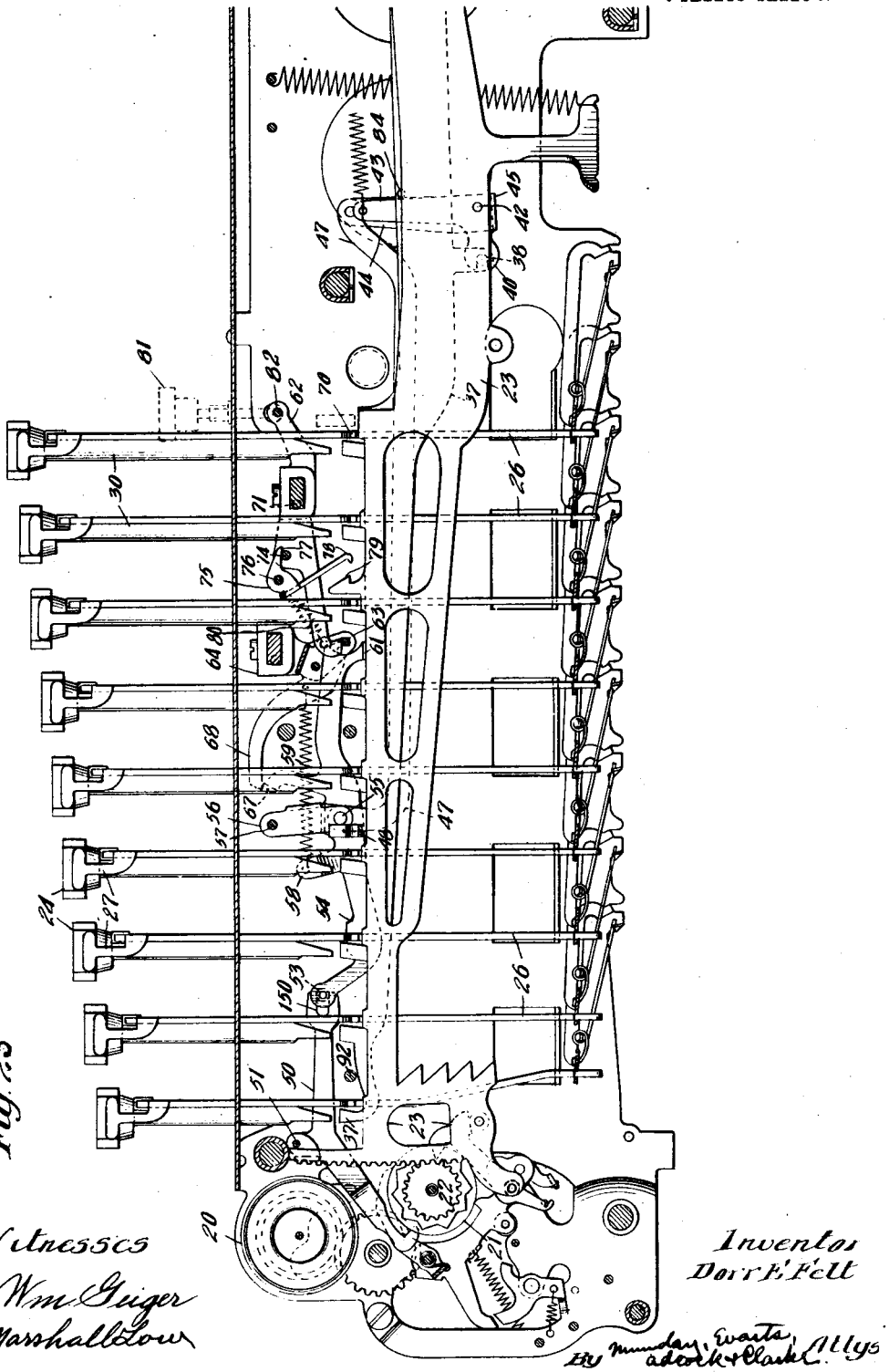

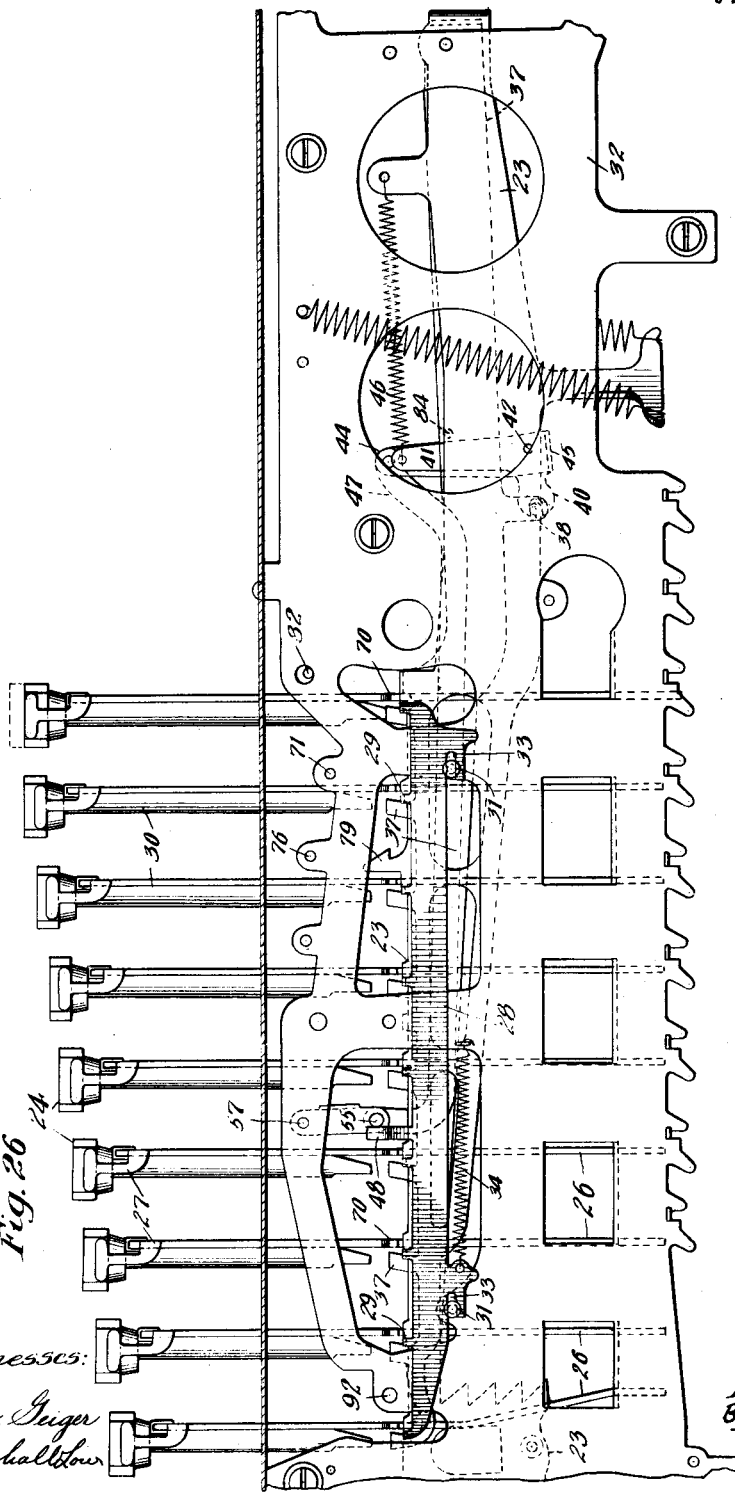

UNITED STATES PATENT OFFICE.

DORR E. FELT, OF CHICAGO, ILLINOIS.

CALCULATING-MACHINE.

1,066,096.  Specification of Letters Patent.  Patented July 1, 1913.

Application filed July 12, 1912. Serial No. 708,945.

*To all whom it may concern:*

Be it known that I, DORR E. FELT, a citizen of the United States, residing in Chicago, in the county of Cook and State of Illinois, have invented a new and useful Improvement in Calculating-Machines, of which the following is a specification.

My invention relates to multiple-order key-driven calculating machines, and particularly to such calculating machines as the well known comptometers set forth in, among others, my prior U. S. Patents, Nos. 762,520 and 762,521 of June 29, 1904, 767,107 of August 9, 1904, 960,528 of June 7, 1910, 992,950 of May 23, 1911, 996,009 of June 20, 1911 and 1,028,344 of June 4, 1912. And the invention has for an object the providing of means whereby a partial and uncompleted key-stroke will cause the locking of not only keys in other orders but also other keys in the same order as the one improperly manipulated; and for a further object, the providing of improved means for locking the keys in other orders when a key in one order receives only such a partial key-stroke; and for a further object, the providing of means for preventing the complete return to normal of the key that has so received only a partial key-stroke; and for a further object, the providing of improved means for holding the numeral wheels locked save when the keys are so manipulated as to cause the proper and intended adding movement of said wheels; and for further objects, such other improvements in construction and function as may be found to obtain in the devices hereinafter set forth or claimed.

To make my invention more clearly understood there are shown in the accompanying drawings constructions for carrying it into practical effect, without limiting the improvements, in their useful applications, to the particular constructions which, for the purpose of example, have been delineated in the drawings.

Figure 7:
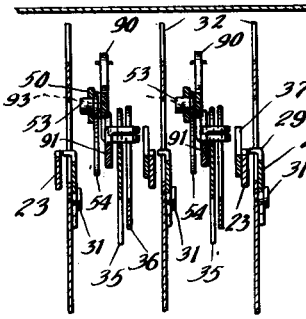
Figure 8:
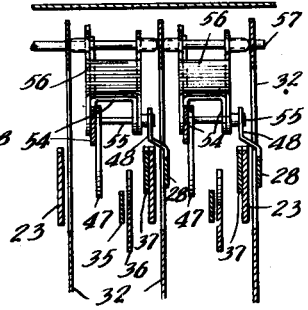
Figure 9:
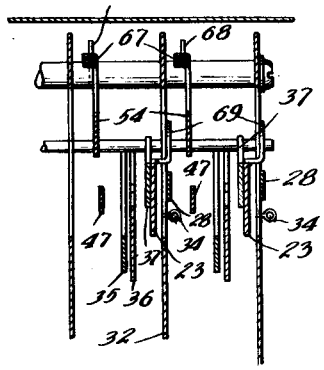
Figure 10:
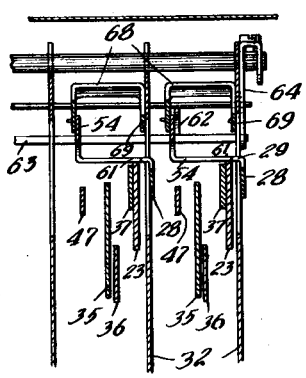
Figure 11:
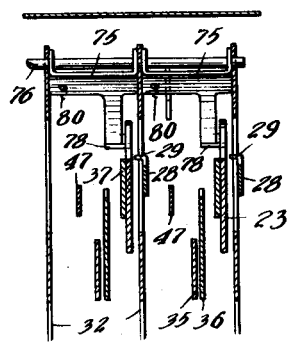

In said drawings, Figure 1 is a longitudinal vertical section of a portion of the machine, the remainder of the machine being shown in Fig. 24 and the parts being shown in their position of rest. Fig. 2 is a like partial longitudinal vertical section showing the parts after the partial stroke of one of the keys. Fig. 3 shows the locking detent for the accumulator-wheel detached, the parts being in the position they have in Fig. 2. Figs. 4, 5, 6, 7, 8, 9, 10, 11, 12 and 13 are sections on the lines 4—4, 5—5, 6—6, 7—7, 8—8, 9—9, 10—10, 11—11, 12—12 and 13—13 respectively of Fig. 1. Fig. 14 is a vertical section of one of the keys detached. Fig. 15 is an elevation of the lever 90 and Fig. 16 is a like view of lever 91. Figs. 17 and 18 are elevations of the stop levers 35 and 36 respectively. Fig. 19 is a like elevation of the auxiliary lever 37; Fig. 20 is a partial elevation of one of the column actuators. Fig. 21 is a longitudinal vertical section of a portion of the machine, similar to Fig. 1, but omitting some of the parts shown in Fig. 1. Fig. 22 is a detail perspective view of the bar for locking the keys, and Fig. 23 is a detail of the stop lever. Fig. 25 is a section like Fig. 1, but showing only the parts beyond the division plate that covers many of the working members in Fig. 1, and also omitting the stop lever devices that immediately coöperate with the coarse-spaced teeth on the rear side of the segment end of the column-actuator. Fig. 26 is a similar section, but showing said division plate and, in relation to it, the bar shown in Fig. 22 and Fig. 1, and some of the parts coöperating with said bar.

In the drawing, 20 represents the numeral wheels, each of which is geared in the usual manner to and is actuated by an accumulator-wheel 21 having a pawl and ratchet connection at its side to a pinion 22, which meshes with the teeth of the column actuator 23 and is driven by such actuator when it moves upward after being depressed by the keys. The keys are illustrated at Figs. 12 and 14, and are each made in two parts one of which is movable with respect to the other, the central button 24 being mounted on a spring tube 30 and capable of being depressed, independently of both the stem 26 and side wings 27, but its depression being necessary to relieve the key from the lock to which it is normally subject. This lock upon the keys is caused by the bars 28, see Figs. 12 and 22, placed alongside of each denominational series of keys, and each having nine upstanding projections 29 with turned over ends one for each key, so placed that said turned over ends will engage the bottom of the projection 70 on the stems 26 of the keys when the keys are depressed.
The bars 28 are supported by stationarily located pins 31, Fig. 1, supported by the division plates 32 between the denominations and entered in slots 33 at each end of the bars, thus rendering the bars easily slidable in longitudinal directions, and springs 34 attached to an upstanding arm of the bars, the tension of which springs forces them back to normal position after they have been moved to unlock the keys. The lock upon the keys by the bar 28 must of course be relieved by sliding the bars sufficiently to carry the projections 29 beyond the keys before the keys can be operated, and this I accomplish by the means now to be described. By the use of the keys described in combination with the key locking bar I am enabled to prevent the interference by the operator's fingers with keys adjacent to the ones struck.

When a key is operated, the key depresses not only the column actuator of the order to which the key belongs, but with the actuator, it also depresses the stop levers 35 and 36 and the auxiliary lever 37 of the same order, the lever 35 acting when the even number keys are struck and the lever 36 acting when the odd number keys are struck. These levers are shown at Figs. 17, 18 and 19 and are arranged parallel to the actuator and also pivoted at the rear of the machine. When any key is struck properly (that is, on the button top 24 instead of merely a glancing blow on a side wing 27), it first encounters the lever 37, which is provided with a laterally projecting pin 38, and this pin enters an open horizontal slot 39 in the forward end of the horizontal arm 40 of an elbow lever 41 pivoted at 42 upon the column actuator. This elbow lever has two separated upright members 43 and 44 connected by a flat member 45, the member 43 being in the same plane with the horizontal member 40 and having a retracting spring 46 attached to its upper end, and the member 44 being made somewhat higher than member 43 and being pivotally attached to the rear end of a longitudinal connection 47, see Figs. 2 and 21, so that the elbow lever, when it is rocked by lever 37, imparts a longitudinal movement to connection 47, and by such movements causes the key lock bar 28 to slide out from its locking position. This is due to the contact by the projection 48 on the bar 28 with the laterally located pin 55 at the upturned forward end of the connection 47. This unlocking of the keys takes place of course early in the key stroke so as not to interfere with or prevent the making of full and complete strokes.

All the parts of the machine which have a longitudinal movement, derive that motion in one direction at least from the longitudinal connection 47, and hence the location of pivot 42, the slot 39 in the arm 40, and the pivot uniting the arm 44 to said connection all become of importance in the machine.

The duty of locking the accumulator so as to control the numeral wheel during the down-stroke of a key is devolved upon detent 50 overhanging the accumulator and pivoted at 51 on a stationary pivot. The point of the detent is adapted to enter between the pins 52 of the accumulator and lock it at the instant any key in the same order with it is struck, holding the wheel locked during that part of the up-and-down key-stroke in which the proper adding-movement of the numeral-wheel is not occurring. The detent is controlled by means of its inner end which is forked as shown at 150 in Fig. 3 and connected with controlling mechanism to be described later on. The detent is withdrawn from its locking position only upon the conclusion of full strokes by the keys and during the rising movement of the column actuators following such full strokes, and of course remains in the locking position when the keys are only partially operated.

In the forked end 150 of the detent 50, is entered the pin 53, carried in the forward end of a lever 54. This lever 54 swings on a centrally located axis consisting of the before-mentioned pin 55, supported by swinging hangers 56 secured to a stationary rod or wire 57. Said lever 54 is also provided with an upstanding arm 58 from which a spring 59 extends to and is fastened to a pin 60 located in the stop lever 68—69, Fig. 23. Beyond the axis 55, the lever 54, see Fig. 3, terminates in a foot 61 which is adapted to contact with and be lifted by the column actuator 23 when the latter returns to normal position after being operated by a key, and above such foot, the lever is also provided with a projection 161 having a surface which in case of a partial key-stroke drops into position for engagement with a transverse square bar 63, supported in swinging hangers 64, Fig. 21, said hangers and bar 63 being normally impelled forwardly by springs 83, Fig. 3, and limited in their backward and forward movements by the recess 164 in the hangers 64 engaged by rod 264.

I have already explained the sliding of the key locking bar 28 from its locking position at the beginning of the key-stroke, the operation so far as such movement is concerned, being the same whether the stroke is a full one or is only partial. At the beginning of a key-stroke the auxiliary lever 37 is at once depressed, and so causes a complete movement of the longitudinal connection 47, and said connection 47 is retracted by the spring 46, on any partial stroke of the key after its forward movement. The axis 55 already mentioned is secured in the forward end of connection 47 and shifts its position with each movement of the latter, and consequently the lever 54 already described moves forward and back with connection 47, its forward end entering the forked end of the detent 50. At the conclusion of the downstrokes one of the key stop levers 35 or 36 will have been depressed with the column actuator and the auxiliary lever 37, and said lever 35 is provided with an upward projection 65 and lever 36 with an upward projection 66 and these projections 65 and 66 are adapted to engage the levers 90 and 91 pivoted at 92, said levers carrying lateral projections 93 and 94 adapted to engage the lever 54 between the axis 55 and the forward end of the lever, on their downward movement, and consequently one or the other of such projections depending upon the key struck whether it is an even or an odd number will depress said lever and rock it on its axis, and in so doing the upstanding arm 67 on lever 54 will be carried forward sufficiently to allow the swinging stop 68, which is normally clear of the arm 67 as shown, to drop behind the arm. In assuming this position the detent 50 is swung on its pivot in a direction which carries its locking end entirely out of the accumulator wheel, leaving the latter entirely free to be rotated by the column actuator in rising to its normal position, and the detent remains locked in this position until the stop 68 is forced up from behind arm 67, by the rising of the column actuator which engages and lifts an arm 69, which is in one piece with the stop and projects forwardly from the pivot. The detent 50 then resumes its normal position relative to the accumulator and the lever 54 also returns to normal under power of the spring 59 as shown. The depression of lever 54 by the projections 93 or 94 becomes fully complete simultaneously with the completion of the key stroke, so that the release of the accumulator cannot take place until that time. Where a key is depressed only partially, as indicated in Fig. 2, the locking bar 28 is first moved from its locking position by the means already described, but the key is detained in a partially lowered position by reason of the engagement of the projection 70 on the key stem under the turned over end of the corresponding projection 29 on the bar 28. This detention of the key enables the operator usually to know at a glance which of the keys is the offending one, and he then proceeds to correct the error by completing the stroke of that key, and when this has been done and the key has returned to normal, it becomes locked with the rest of the machine and it then becomes necessary before proceeding with the adding or other operation in process at the time the partial stroke was given, to release the general lock upon the machine which may be done by operating the releasing key 81 as hereinafter stated. When any key is only partially operated, the connection 47 will be operated because the key lock bar 28 is moved from its locking position when the keys receive either partial or full strokes, and with the connection 47 the lever 54 receives a longitudinal movement toward the front. The lever 54 when the actuator is up, has its projection 161 in a position above the bar 63 and when the actuator is depressed, support is withdrawn from the foot 61 and the projection 161 rests on the bar 63 until pushed forwardly by the movement of connection 47, whereupon the projection 161 thereof will fall to a position on a level with the bar 63 due to the action of the spring 59 on the lever 54 about the pivot 55. Levers 62 have front hooked ends which normally are upheld by the cross bar 63, as shown in Figs. 1 and 21. Upon a partial depression of any key neither projection 93 nor 94, of levers 90 and 91 respectively, contacts lever 54 to depress the forward end thereof as previously described for a complete depression, hence the column actuator does not return to its normal position upon release of the key but the auxiliary lever 37 rises slightly, whereupon the levers 44 and 43 are retracted by the spring 46, and at the same time connection 47 moves rearwardly, thereby taking lever 54 along with it. The projection 161 of the lever 54 being now on a level with square bar 63, upon being retracted, will engage bar 63 and move the same rearwardly. When bar 63 is moved in this manner, the support for the hooked ends of levers 62 is withdrawn and said hooked ends engage the forward side of the square bar 63 and hold it retracted, see Fig. 2. The levers 62 support a shaft 74, and a series of hook holders 75, one in each order, are mounted on a shaft 76 and have lips 77 resting on shaft 74. Said holders each support a hook 78 adapted to swing under the upstanding hook 79 on the column actuator, when left free to yield to a spring 80, which constantly tends to swing it into engagement with each actuator hook. When the levers 62 fall to the position of Fig. 2 the shaft 74 falls so as to relieve the pressure on the lips 77 on said shaft, and thus allow the springs 80 of all the orders to swing the hooks 78 into engagement with the actuators. I thus lock all of the actuators in the machine except that of any order containing the partially depressed key, and all the keys of said order containing the partially depressed key are at the same time rendered incapable of operating by the engagement of the projections 70 on their stems with the projections 29 on the bars 28. The actuator of the order containing the offending key will become locked in the same manner as the actuators of the other orders immediately on the completion of the stroke by the offending key, but the other orders are locked immediately that the aforesaid slight rise of an auxiliary lever 37 occurs, just at the initial part of the return movement of the partially depressed key. As the actuator now returns to its uppermost position, the foot 61 of lever 54 will be lifted thereby to a position where the projection 161 will pass over the bar 63, but inasmuch as the hooked ends of the levers 62 hold the bar 63 retracted, the latter cannot return to its forward normal position, until said hooked ends of levers 62 are lifted as described in the following statement. When it is desired to release the keys from the lock upon their actuators, the operator presses downward on the key 81. This key bears upon the cross bar 82 connecting the levers 62 upon the opposite sides of the machine, and thereby lifts the hooked ends of said levers to normal position, freeing the hooks 78 from the actuators and causing a renewal of the pressure by the lips 77 on shaft 74. The pins 84 in the auxiliary levers act as stops to the backward movement of the members 43 of the elbow levers 41.

I claim:—

1. The combination in a multiple-order key-driven calculating machine, of a column-actuator, a denominational series of keys, a bar arranged along the series and acting normally to lock them, and means for moving said bar when one of the series is struck to carry the bar out from locking position, embracing members mounted on and tensioned to the column-actuator and connected to the locking bar and actuated from the struck key.

2. The combination in a multiple-order key-driven calculating machine, of a column-actuator, a denominational series of keys, a bar arranged along the series and adapted normally to engage each of them, and members mounted on and tensioned to the column-actuator and receiving power from said keys when struck, and acting to cause the bar to move out from locking position.

3. The combination in a multiple-order key-driven calculating machine, of a column-actuator, a denominational series of keys, a bar arranged along the series and adapted to normally lock them, and an elbow lever mounted on the column actuator and acting when any key is struck to cause the release of the keys from the lock of said bar.

4. The combination in a multiple-order key-driven calculating machine, of a column-actuator, a denominational series of keys, a sliding bar arranged along the series and adapted to normally lock them, and means including an elbow lever mounted on the column actuator and receiving power from any key which may be struck and acting to cause the bar to slide from its locking position.

5. The combination in a multiple-order key-driven calculating machine, of a denominational series of keys, a sliding bar arranged along the series and having projections adapted to normally lock the keys individually, and means including an elbow lever receiving power from any of said keys when struck, and connections from the lever to said bar adapted to cause the sliding of the bar from its locking position.

6. The combination in a multiple-order key-driven calculating machine, of a column-actuator, a denominational series of keys, a sliding bar arranged along the series and adapted to normally lock them, an elbow lever pivoted on the column actuator, an auxiliary lever actuated by the keys, and itself actuating said elbow lever, and connections from the elbow lever to said sliding bar acting to slide the bar from its locking position.

7. The combination in a multiple-order key-driven calculating machine, of a column-actuator, a denominational series of keys, a sliding bar arranged along the series and adapted to normally lock them, an elbow lever pivoted on the column actuator, the actuating connections between the elbow lever and the locking bar, and means for actuating said elbow lever and causing it to impart a sliding movement to said bar.

8. The combination in a multiple-order key-driven calculating machine of a denominational series of keys, a sliding bar arranged along the series and adapted to normally lock them, the auxiliary lever, and connections between said lever and said locking bar, whereby the depression of said lever under a key stroke causes a sliding movement of the locking bar.

9. The combination in a multiple-order key-driven calculating machine, of a numeral wheel, the keys driving the same, a detent causing the locking of said wheel throughout a partial key-stroke, mechanism controlled by said keys and connected to the detent and acting only when any of the keys makes a full adding stroke, to move the detent positively and thereby release the numeral wheel.

10. The combination in a multiple-order key-driven calculating machine, of a numeral wheel, its accumulator, the keys driving the same, a pivoted detent overhanging the accumulator and acting to lock the latter throughout a partial key-stroke, and mechanism joined to the free end of the detent and acting on the completion of a full down stroke by any of said keys to depress said free end and thereby lift the detent out of the accumulator.

11. The combination in a multiple-order key-driven calculating machine of a numeral wheel, the keys, a detent pivoted between its ends, one end of the detent causing the locking of said wheel throughout a partial key-stroke, and the other end being free and serving as a means of positioning the locking end, and mechanism controlled by the keys and joined to said free end, and acting when any of said keys makes a full stroke to swing the detent and release the wheel.

12. The combination in a multiple-order key-driven calculating machine of a numeral wheel, the keys, a detent pivoted between its ends, one end of the detent causing the locking of said wheel throughout a partial key-stroke, and the other end being free and serving as a means of positioning the locking end, and mechanism controlled by the keys and joined to said free end, and acting when any of said keys makes a full stroke to depress said free end of the detent and cause the locking end to release its locking action.

13. The combination in a multiple-order key-driven calculating machine with the numeral wheels and the keys, of means for locking the numeral wheels, and means for locking all the other keys when a partial stroke of a key is made.

14. The combination in a multiple-order key-driven calculating machine with the numeral wheels and the keys, of means for preventing improper manipulation of the keys, means for locking the numeral wheels throughout a partial key-stroke and releasable only during full adding strokes of the keys, and means for locking all the other keys when a key is only partially operated.

15. The combination in a multiple-order key-driven calculating machine with the numeral wheels and the keys, of means for locking the keys adapted to be released when any key is properly struck, means for locking the numeral wheels throughout a partial key-stroke and adapted to be released only when a key has been given a complete stroke, and means locking all the other keys when a key has received only a partial stroke.

16. In a multiple-order key-driven calculating machine, in combination: the adding-mechanism; the multiple series of keys driving said adding mechanism; and locking mechanism adapted to lock other orders of the keys when a key of one order receives only a partial key-stroke, and also to lock other keys of the same order; substantially as specified.

17. In a multiple-order key-driven calculating machine, in combination: the adding-mechanism; the multiple series of keys driving said adding-mechanism; and mechanism adapted to prevent the complete return to normal of a key that receives only a partial key-stroke; substantially as specified.

18. In a multiple-order key-driven calculating machine, in combination: the adding mechanism; the multiple series of keys driving said adding-mechanism; locking mechanism adapted to lock other orders of the keys when a key of one order receives only a partial key-stroke; and mechanism adapted to prevent the complete return to normal of a key that receives only a partial key-stroke; substantially as specified.

19. In a multiple-order key-driven calculating machine, in combination: the adding mechanism; the multiple series of keys driving said adding-mechanism; locking mechanism adapted to lock other orders of the keys when a key of one order receives only a partial key-stroke, and also to lock other keys of the same order; and mechanism adapted to prevent the complete return to normal of a key that receives only a partial key-stroke; substantially as specified.

20. In a multiple-order key-driven calculating machine, in combination: the adding-mechanism, including column actuators in the several orders; the multiple series of keys driving said adding-mechanism; and locking mechanism adapted to lock other orders of the keys when a key of one order receives only a partial key-stroke, said locking mechanism including in each order an actuating-device whose actuation augments the actuation of the column actuator in that order; substantially as specified.

21. In a multiple-order key-driven calculating machine, in combination: the adding-mechanism, including column actuators in the several orders; the multiple series of keys driving said adding-mechanism; and locking mechanism adapted to lock other orders of the keys when a key of one order receives only a partial key-stroke, said locking mechanism including in each order an actuating-device whose actuation augments the actuation of the column actuator in that order, said actuating-device being a depressible lever having a lifting tension member mounted on the column-actuator; substantially as specified.

22. In a multiple-order key-driven calculating machine, in combination: the adding-mechanism, including column-actuators in the several orders; the multiple series of keys driving said adding-mechanism; and locking mechanism adapted to lock other orders when a key of one order receives only a partial key-stroke, said locking mechanism being provided with a trip-device auxiliary to the column-actuator depressed and having a guard-device to prevent the trip-action during a proper adding movement of said column-actuator; substantially as specified.

23. In a multiple-order key-driven calculating machine, in combination: the adding-mechanism; the multiple series of keys driving said adding-mechanism; and locking mechanism adapted to lock other orders when a key of one order receives only a partial key-stroke, and also to lock other keys of the same order, the first-named locking being effected through a trip-device that may operate independently of the devices effecting the locking of the other keys of the same order; substantially as specified.

24. In a multiple-order key-driven calculating machine, in combination: the adding mechanism, including carrying devices adapted to permit said adding-mechanism to receive prime actuations in a plurality of orders simultaneously; the multiple series of keys driving said adding-mechanism; and locking mechanism adapted to lock other orders of the keys when a key of one order receives only a partial key-stroke, and also to lock other keys of the same order, substantially as specified.

25. In a multiple-order key-driven calculating machine, in combination; the adding-mechanism, including carrying devices adapted to permit said adding-mechanism to receive prime actuations in a plurality of orders simultaneously; the multiple series of keys driving said adding - mechanism; and mechanism adapted to prevent the complete return to normal of a key that receives only a partial key-stroke; said preventive mechanism being operable in a plurality of orders simultaneously but its release in one order effecting a locking of that order until other misoperated orders are released; substantially as specified.

26. In a multiple-order key-driven calculating machine, in combination: the adding-mechanism, including carrying devices adapted to permit said adding-mechanism to receive prime actuations in a plurality of orders simultaneously; the multiple series of keys driving said adding-mechanism; locking mechanism adapted to lock other orders of the keys when a key of one order receives only a partial key - stroke; and mechanism adapted to prevent the complete return to normal of a key that receives only a partial key-stroke; the locking being operable in each of a plurality of orders simultaneously and releasable upon complete manipulation of a key in each order where keys have been so simultaneously misoperated; substantially as specified.

27. In a multiple-order key-driven calculating machine, in combination: the adding mechanism, including carrying devices adapted to permit said adding-mechanism to receive prime actuations in a plurality of orders simultaneously; the multiple series of keys driving said adding - mechanism; locking mechanism adapted to lock other orders of the keys when a key of one order receives only a partial key-stroke, and also to lock other keys of the same order; and mechanism adapted to prevent the complete return to normal of a key that receives only a partial key-stroke; the locking being operable in each of a plurality of orders simultaneously and releasable upon complete manipulation of a key in each order where keys have been so simultaneously misoperated, substantially as specified.

28. In a multiple-order key-driven calculating machine, in combination: the adding-mechanism, including carrying devices adapted to permit said adding-mechanism to receive prime actuations in a plurality of orders simultaneously; the multiple series of keys driving said adding - mechanism; and locking mechanism adapted to lock other orders when a key of one order receives only a partial key-stroke, and also to lock other keys of the same order, the first-named locking being effected through a trip-device that may operate independently of the devices effecting the locking of the other keys of the same order; the locking being operable in each of a plurality of orders simultaneously and releasable upon complete manipulation of a key in each order where keys have been so simultaneously misoperated; substantially as specified.

29. In a multiple-order key-driven calculating machine, in combination: the adding-mechanism, including numeral wheels, prime-actuators therefor, and carrying devices adapted to permit said adding-mechanism to receive prime actuations in a plurality of orders simultaneously; the multiple series of keys driving said adding-mechanism; locking mechanism causing the locking of the numeral wheels throughout a partial key-stroke; and mechanism controlled by said keys and connected to said numeral-wheel locking mechanism and acting positively and only when any of the keys makes a proper adding stroke, to positively restore said locking mechanism to normal and thereby release the corresponding numeral wheel; said numeral - wheel locking mechanism being operable in a plurality of orders simultaneously and permitting simultaneous operation of numeral wheels in other orders; substantially as specified.

30. In a multiple-order key-driven calculating machine, in combination: the adding-mechanism, including numeral wheels, prime-actuators therefor, and carrying devices adapted to permit said adding-mechanism to receive prime actuations in a plurality of orders simultaneously; the multiple series of keys driving said adding-mechanism; stop-mechanism normally engaging said wheels but released during movement of the prime-actuators; and locking mechanism put in action to lock the numeral wheel as soon as a key is struck but released at the conclusion of a proper down-stroke of the key; said numeral-wheel locking mechanism being operable in a plurality of orders simultaneously and permitting simultaneous operation of numeral wheels in other orders; substantially as specified.

31. In a multiple-order key-driven calculating machine, in combination: the adding-mechanism including numeral wheels, column actuators therefor, and carrying devices adapted to permit said adding-mechanism to receive prime-actuations in a plurality of orders simultaneously; the multiple series of keys driving said adding-mechanism; and locking mechanism adapted to lock other orders when a key in one order receives only a partial key-stroke, said locking mechanism including the auxiliary levers movable relatively to the column-actuators, and the locking action taking effect at the initial part of the return movement of the so manipulated key; the locking being operable in each of a plurality of orders simultaneously and releasable upon complete manipulation of a key in each order where keys have been so simultaneously misoperated; substantially as specified.

32. In a multiple-order key-driven calculating machine, in combination: the adding-mechanism; the multiple series of keys driving said adding-mechanism; and locking mechanism adapted to lock other keys in the same order when a key receives only a partial key-stroke, said locking means remaining inactive until the partially depressed key is permitted to rise toward normal; substantially as specified.

33. In a multiple-order key-driven calculating machine, in combination: the adding-mechanism; the multiple series of keys driving said adding-mechanism; locking mechanism adapted to lock other keys in the same order when a key receives only a partial key-stroke, said locking means remaining inactive until the partially depressed key is permitted to rise toward normal; and mechanism adapted to prevent the complete return to normal of the key that has been so misoperated; substantially as specified.

34. In a multiple-order key-driven calculating machine, in combination: the adding-mechanism; the multiple series of keys driving said adding-mechanism; locking mechanism adapted to lock other keys in the same order when a key receives only a partial key-stroke, said locking means remaining inactive until the partially depressed key is permitted to rise toward normal; locking mechanism for locking all the keys when the operation of the partially depressed key is complete; and releasing means for releasing said locking mechanism; substantially as specified.

35. In a key-driven calculating machine, in combination: driven accumulator mechanism; finger-keys whose manipulation provides the power for driving said accumulator mechanism, said keys being individually in two parts, one adapted to be struck and moved before the other is; and resilient devices adapted to cushion the initial movement of the first-moved of said key-parts and also to augment the driving action of the later-moved of said key-parts; substantially as specified.

36. In a key-driven machine, in combination: driven mechanism; finger-keys whose manipulation provides the power for driving said mechanism, said keys being individually in two parts, one adapted to be struck and moved before the other is; and resilient devices adapted to cushion the initial movement of the first-moved of said key-parts and also to augment the driving action of the later-moved of said key-parts; substantially as specified.

37. In a multiple-order key-driven calculating machine, in combination: the adding-mechanism, including carrying devices adapted to permit said adding-mechanism to receive prime actuations in a plurality of orders simultaneously; the multiple series of keys driving said adding-mechanism; locking mechanism adapted to lock other keys in the same order when a key receives only a partial key-stroke, said locking means remaining inactive until the partially depressed key is permitted to rise toward normal; the locking being operable in each of a plurality of orders simultaneously and releasable upon complete manipulation of a key in each order where keys have been so simultaneously misoperated; substantially as specified.

38. In a multiple-order key-driven calculating machine, in combination: the adding mechanism, including carrying devices adapted to permit said adding-mechanism to receive prime actuations in a plurality of orders simultaneously; the multiple series of keys driving said adding-mechanism; locking mechanism adapted to lock other keys in the same order when a key receives only a partial key-stroke, said locking means remaining inactive until the partially depressed key is permitted to rise toward normal; and mechanism adapted to prevent the complete return to normal of the key that has been so misoperated; the locking being operable in each of a plurality of orders simultaneously and releasable upon complete manipulation of a key in each order where keys have been so simultaneously misoperated; substantially as specified.

39. In a multiple-order key-driven calculating machine, in combination: the adding-mechanism, including carrying devices adapted to permit said adding-mechanism to receive prime actuations in a plurality of orders simultaneously; the multiple series of keys driving said adding-mechanism; locking mechanism adapted to lock other keys in the same order when a key receives only a partial key-stroke, said locking means remaining inactive until the partially depressed key is permitted to rise toward normal; locking mechanism for locking all the keys when the operation of the partially depressed key is complete; and releasing means for releasing said locking mechanism; the locking being operable in each of a plurality of orders simultaneously and releasable upon complete manipulation of a key in each order where keys have been so simultaneously misoperated; substantially as specified.

DORR E. FELT.

Witnesses:
PHILIP E. KUNTZ,
WILBUR KUNTZ.